Dec. 15, 1925.      R. W. SCHROEDER      1,565,866
FLOW METER
Filed Feb. 16, 1921      4 Sheets-Sheet 2
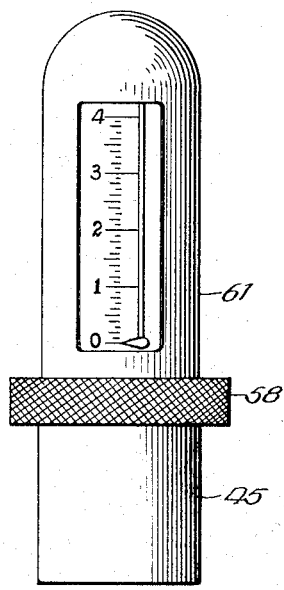
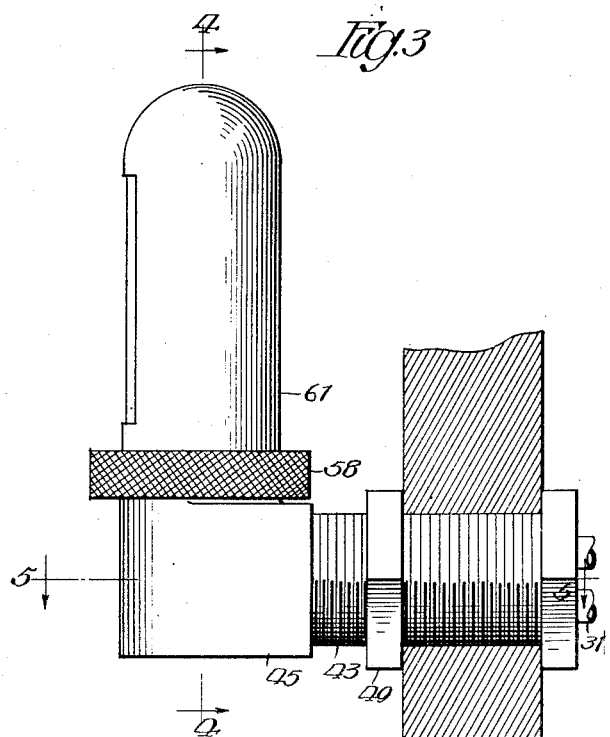
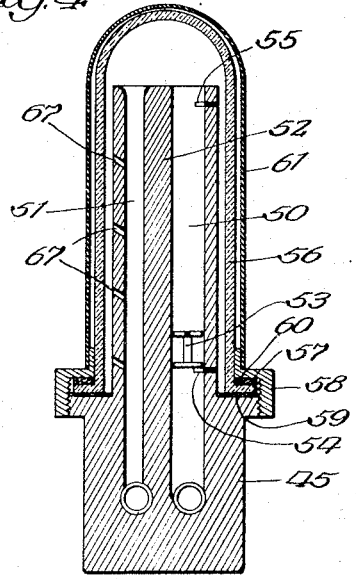
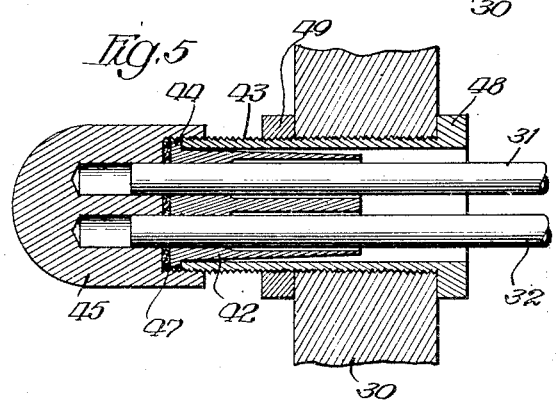
Inventor:
Rudolph W. Schroeder
By Nissen & Grand Attys Dec. 15, 1925.
R. W. SCHROEDER
FLOW METER
Filed Feb. 16, 1921 4 Sheets-Sheet 3
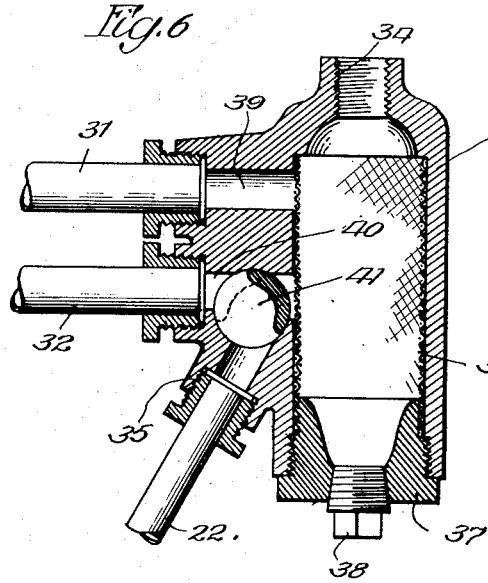
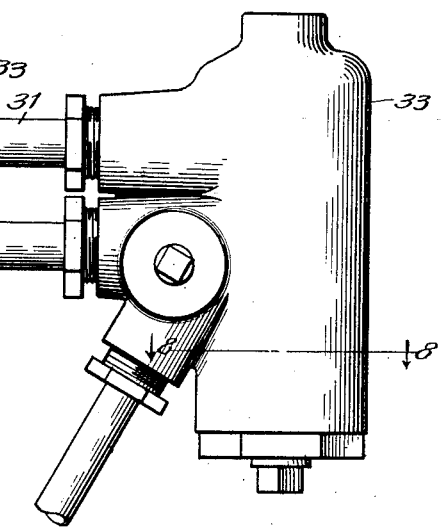
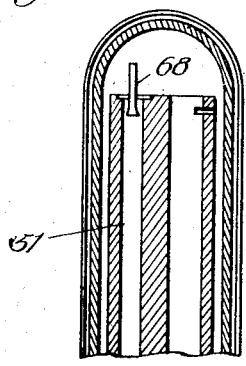
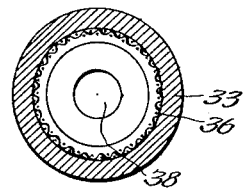
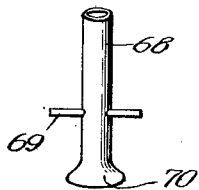
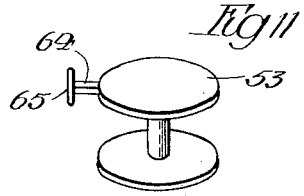
Inventor
Rudolph W. Schroeder
By Nissen & Crane Attys Dec. 15, 1925.                                              1,565,866
                    R. W. SCHROEDER
                       FLOW METER
                  Filed Feb. 16, 1921      4 Sheets-Sheet 4
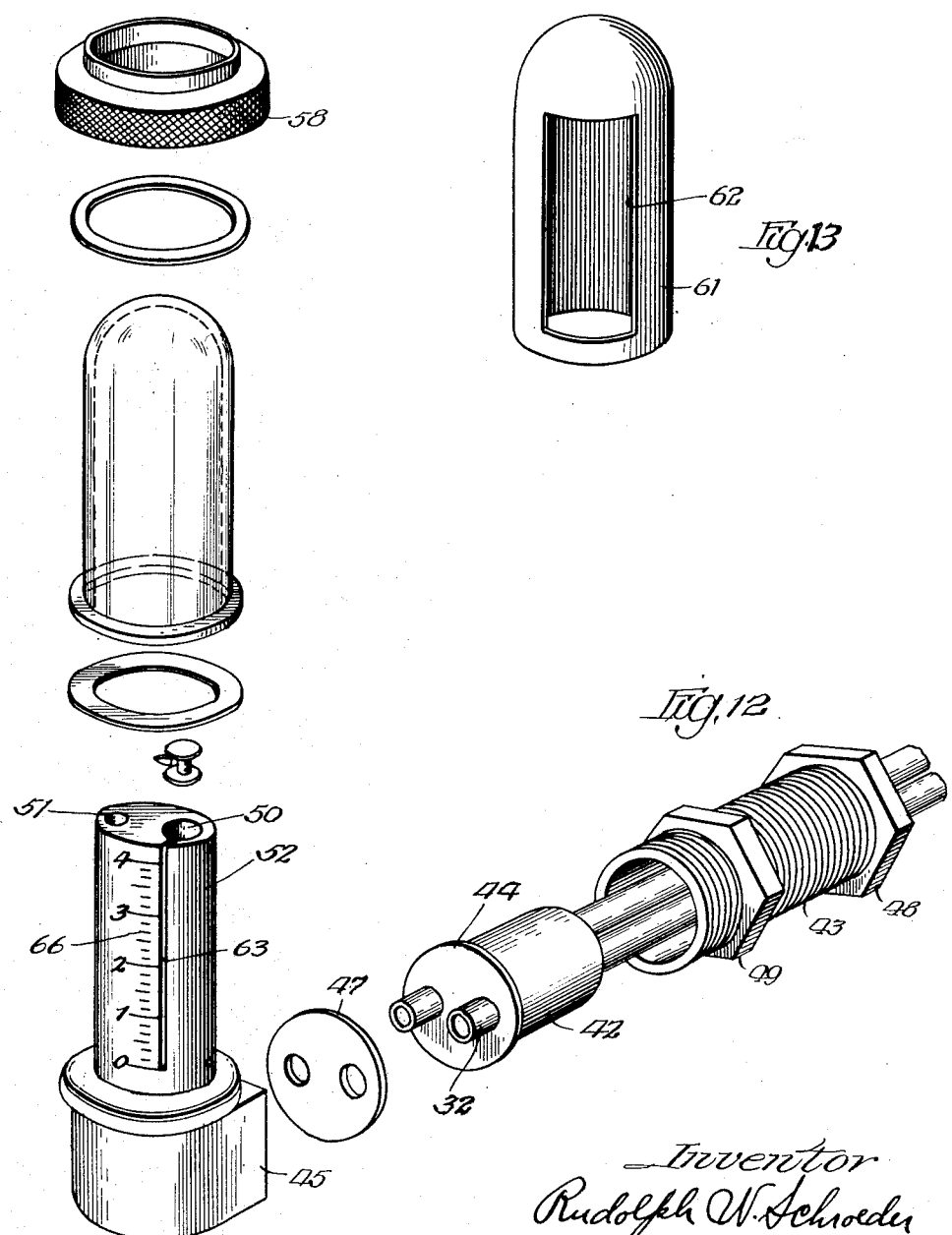

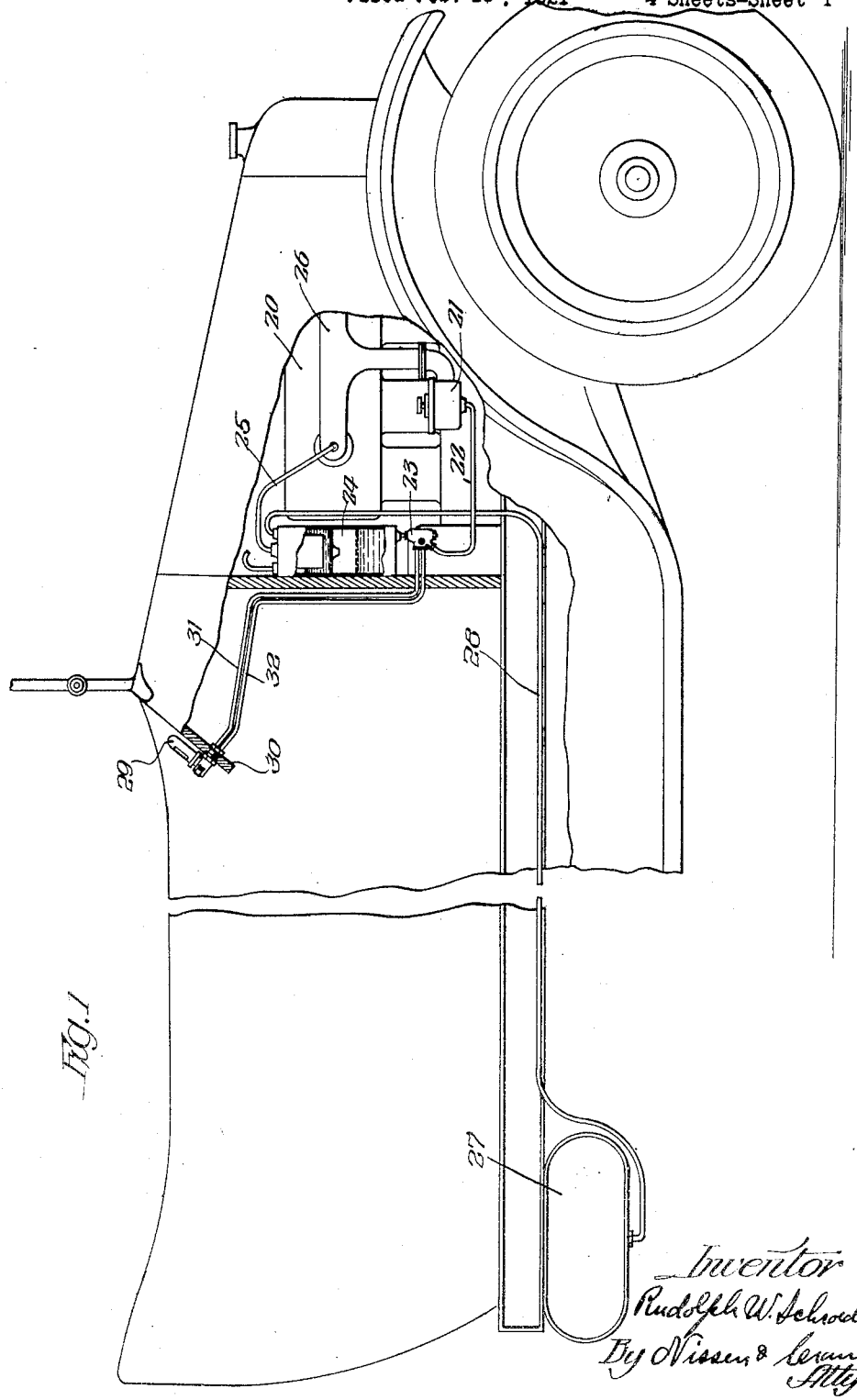

Patented Dec. 15, 1925.

1,565,866

UNITED STATES PATENT OFFICE.

RUDOLPH W. SCHROEDER, OF CHICAGO, ILLINOIS.

FLOW METER.

Application filed February 16, 1921. Serial No. 445,503.

*To all whom it may concern:*

Be it known that I, RUDOLPH W. SCHROE-DER, a citizen of the United States, residing at Chicago, in the county of Cook and State of Illinois, have invented certain new and useful Improvements in Flow Meters, of which the following is a specification.

This invention relates to an instrument for measuring the rate of flow of fluids, and especially to such an instrument as adapted for measuring the flow of fuel to an internal combustion engine, such as is used for driving automobiles, motor boats, tractors, aeroplanes, or other movable or stationary liquid burning engines.

The object of the invention is to provide a flow meter which shall operate satisfactorily under the conditions present in various conveyances driven by motors using liquid fluid and in other installations, and to provide a device of this nature which shall be of improved construction and operation.

The invention is exemplified in the combination and arrangement of parts shown in the accompanying drawings and described in the following specifications, and it is more particularly pointed out in the appended claims.

In the drawings—

Fig. 1 is a fragmentary elevation of a portion of an automobile showing one installation of the present invention;

Fig. 2 is a front elevation of the flow meter proper as it appears on the dashboard of a vehicle;

Fig. 3 is a side elevation of the instrument shown in Fig. 2 showing its connection with a dashboard or other support;

Fig. 4 is a vertical section on line 4—4 of Fig. 3;

Fig. 5 is a horizontal section on line 5—5 of Fig. 3;

Fig. 6 is a vertical section of a bypass valve arranged in the pipe line of the fuel system;

Fig. 7 is an elevation of the valve shown in Fig. 6;

Fig. 8 is a horizontal section on line 8—8 of Fig. 7;

Fig. 9 is a fragmentary vertical section of a flow meter having a modified form of venting device;

Fig. 10 is a perspective detail of the venting device shown in Fig. 9;

Fig. 11 is a detail perspective of the movable piston forming a part of the flow meter;

Fig. 12 is a perspective view of the parts of the flow meter and its attachments separated from one another to show the construction in various parts; and Fig. 13 is a perspective of a protector shield for the flow meter casing.

The importance of a device for indicating the instantaneous rate of flow of fuel to the engine at all times, as a matter of fuel economy, can hardly be over-estimated. Such an instrument will enable the operator to determine the most economical speed or the best adjustment of the engine under all conditions of operation, and will also indicate the existence of any condition causing abnormal consumption of fuel. The device thus becomes an indicator of the condition not only of the engine proper, but of the machinery driven by the engine. A device of this nature used in connection with an automobile or other conveyance in order to be visible at all times is preferably carried on the dashboard and consequently occupies a position higher than the level of the liquid fuel in the main supply or the vacuum tank. If the instrument is in a vacuum system it must be absolutely air-tight to prevent destruction of the siphoning action of the connecting tubes, and the same thing is true if a forced feed system is used.

In Fig. 1 of the drawings, the numeral 20 designates an internal combustion engine provided with a carbureter 21 to which fuel is supplied through a pipe 22. The pipe 22 is connected through a bypass casing 23 to a vacuum tank 24 of usual construction. The tank 24 is provided with a connection 25 with the intake manifold 26 of the engine 20, by means of which fuel is drawn from the main supply tank 27 through a pipe 28. A flow meter 29, constructed according to the present invention, is mounted upon the dashboard 30 of the vehicle and is connected by pipes 31 and 32 with the bypass casing 23 so that when the valve 41 within said casing is set in one position the fuel entering the carbureter 21 through the pipe 22 passes through the flow meter 29. When it is desired to disconnect the flow meter from the system the bypass valve may be set to connect the pipe 22 directly with the vacuum tank 24.

The construction of the bypass casing 23 will be best understood from Figs. 6 and 7. This by-pass comprises a casing 33 having an inlet connection 34 with the supply tank and having an outlet connection 35 with the pipe 22 which communicates with the carbureter. A screen 36 is placed within the casing 33 so that any fuel passing through the valve is strained through this screen before it reaches either the flow meter or the carbureter. The screen 36 is held in place by a plug 37 tightly screwed in the lower end of the casing 33 and provided with a drain plug 38. The pipe 31 leading to the flow meter communicates with the interior of the casing 33 through an opening 39, and the discharge pipe 32 from the flow meter is also connected with an opening 40 communicating with the interior of the casing 33. A rotary valve 41 is interposed in the opening 40 so as to connect the pipe 22 either with the pipe 32, as shown in full lines in Fig. 6, or with the interior of the casing 33, as shown in broken lines in that figure. When the valve is in the position shown in full lines all fuel reaching the engine must pass through the flow meter, but if for any reason it is desired to disconnect the flow meter from the system, this may be done by turning the valve into the position shown in broken lines in the figure, in which case the fuel will pass directly from the by-pass chamber to the carbureter.

As shown in Figs. 5 and 12, the pipes 31 and 32 are provided with an air-tight connection with the flow meter 29 by means of a plug fitting 42 having openings for receiving the pipes 31 and 32, in which openings the pipes may be soldered or otherwise secured so as to provide air-tight connection. The plug fitting 42 fits in an externally threaded sleeve 43 which is threaded into an opening in the base member 45 of the flow meter 29. The sleeve 43 bears against a flange 44 on the fitting 42 and forces the fitting against a gasket 47 so as to make a tight connection between the pipes 31 and 32 and the base member 45. The sleeve 43 is provided with a flange 48 and a nut 49 by means of which the sleeve is firmly held in the dashboard 30, thus supporting the flow meter 29 in place on the board. The base member 45 is provided with two parallel vertical openings 50 and 51 extending through an upstanding member 52 formed integrally with the base member 45. A movable plug or piston 53 is arranged in the opening 50 so as to move vertically therein. Stops 54 and 55 are provided for limiting the movement of the piston 53. The piston 53 preferably does not make an absolute liquid-tight joint with the interior of the opening 50, but sufficient clearance is provided to permit a slight leakage of fluid past the piston. A cover or casing 56, preferably in the form of a glass cylinder having its upper end closed, surrounds the member 52 and is provided with a flange 57 at its lower end by which a tight connection is secured with the shoulder on the base member 45. The flange 57 is held in place by a threaded fitting 58 and is provided with gaskets 59 and 60 to secure a tight joint and prevent injury to the flange. A protecting shield or cover 61 may be placed upon the fitting 58 and provided with an opening 62, as shown in Fig. 13, through which readings of the instrument may be made.

The portion of the member 52 forming the side wall of the opening 50 is provided with a slot 63 extending longitudinally of the opening 50 and providing communication between the opening 50 and the chamber within the cover 56. The piston 53 carries a pin 64 which moves up and down in the slot 63 and which carries a pointer 65 arranged to play over a graduated scale 66 on the front face of the member 52 in position to be read through the opening 62 in the cover 61.

To use the instrument, the valve 41 is turned to the position shown in Fig. 6 and fuel from the tank 24 will fill the pipes 31 and 32 to the level of the fuel in the tank. In order to completely fill the tubes 31 and 32 and the flow meter chamber the operator may blow into the supply tank, forcing the fluid up the tube 31 until the flow meter and connecting tubes are entirely filled. Thereafter the flow meter and connecting tubes will act as a siphon and continue to be filled with the fuel. As the engine operates it will produce a partial vacuum in the carbureter 21, tending to draw fuel through the flow meter and reducing the pressure in the tube 32, the opening 51, and the chamber within the cover 56. This will produce a pressure difference between the interior of the opening 50 and the chamber of the carbureter, causing a flow of fluid from the opening 50 through the portion of the slot 63 below the piston 53. This flow of fluid will cause the piston 53 to rise within the opening 50; the position of the piston in the opening is maintained by the pressure difference created. The length of the slot uncovered will, of course, be proportional to the flow of fluid through the slot to the engine since the buoyancy of the piston is constant, and consequently the height of the piston 53 and the position of the pointer 65 will be proportional to the fluid supplied to the engine at any particular instant. The piston 53 may be made slightly heavier than the amount of fluid which it displaces so that when no fluid is flowing it will settle to the bottom of the opening 50 and the pointer will indicate zero on the scale. When the engine is operating the pointer will rise with the piston and show directly the consumption of fuel in gallons per hour, or pounds per hour, or in any other desired units, according to the calibration of the scale 66.

Whether the flow meter is used in a vacuum or pressure system its position above the fuel supply may give rise to the accumulation of gas or air in the top of the meter. In order that such accumulation may not interfere with the operation of the supply system it is desirable that the meter shall be made self-venting. It will be seen that the exit opening 51 is open at its upper end near the top of the meter casing so that flow of fluid from the casing through the opening 51 will give rise to a circular motion, such as that which occurs when water is drained from a sink, and this motion will entrap with the liquid any gas or air which may have accumulated in the casing and draw it off with the liquid. Additional openings 67 may be provided through the wall of the tube 51 to assist in drawing off air from the meter casing.

In the form of the invention shown in Fig. 9, a tube 68 is supported by a pin 69 in the upper end of the opening 51 and is provided at its lower end with a flared portion 70. The passage of fluid through the opening 51 from the upper portion of the meter chamber will produce a reduced pressure in the flared portion 70 of the tube 68, which will cause any air or gas in the upper part of the casing to rush downwardly through the tube 68 and be carried away with the liquid. In this way the flow meter may be made to be self-venting, and danger of accumulation of air or gas therein is thus avoided.

I claim :—

1. In a device of the character described, a standpipe with parallel chambers therein, one for the inlet of liquid and the other for the outlet of liquid, a transparent casing providing a chamber surrounding said standpipe, a longitudinal slot in the wall of said inlet chamber communicating with the chamber surrounding said standpipe, and a piston movable in the inlet chamber and having a pointer thereon projecting through said slot for indicating the instantaneous flow of fluid through said device.

2. In a device of the character described, a standpipe having parallel openings therein, one for the inlet of liquid and the other for the outlet of liquid, a transparent casing providing a chamber surrounding the standpipe and communicating with said openings, there being an air space above said standpipe with which said outlet opening communicates for the purpose of venting or drawing out the entrained air by the stream of liquid through said outlet opening.

3. A flow meter comprising a housing, a member within said housing having vertically arranged inlet and outlet passages therein, said inlet passage having a slot in the wall thereof for permitting the discharge of fluid from said passage to the interior of said housing, and a vertically movable member arranged within said passage and movable therein to indicate the rate of flow of fluid through said slot, said outlet passage having an intake opening near the upper portion of said housing for drawing off air or gas tending to collect in said housing.

4. A flow meter comprising a base member having an upright standpipe connected therewith, a housing surrounding said standpipe and providing a chamber, said standpipe having intake and outlet passages extending longitudinally thereof and open at their upper ends, the wall of said intake passage having a longitudinally extending slot therein communicating with the interior of said chamber, a piston movable in said intake passage for indicating the rate of flow of fluid through said slot to said chamber, and means for connecting said intake and outlet openings, respectively, with a source of liquid fuel supply and a liquid fuel motor.

5. In a motor conveyance, a supply tank, a motor, a flow meter interposed between said tank and said motor, said flow meter comprising a base member having intake and outlet openings, pipes for connecting said openings with said tank and said motor, respectively, and a single fitting for providing air-tight connection between said pipes and said base member.

6. In a motor conveyance, a supply tank, a motor, a flow meter interposed between said tank and motor, said flow meter comprising a base member having intake and outlet openings thereto, a plug fitting having pipes therein connecting with said openings, a sleeve for holding said fitting in tight connection with said base member, and means for securing said sleeve to a dashboard or support.

7. In combination with a motor, a fuel supply tank, of a motor conveyance, a flow meter interposed between said motor and tank, a bypass valve having a screen therein for alternatively connecting or disconnecting said flow meter, said flow meter comprising a base member having intake and outlet openings connected with said bypass valve, a standpipe on said base member having upright intake and outlet passages therein, a glass casing surrounding said standpipe and having the upper end thereof closed, said standpipe having a longitudinal slot therein connecting said intake passage with the interior of said casing, a movable member in said intake passage for indicating the instantaneous rate of flow of fluid through said flow meter, and a protective housing surrounding said casing and having an opening therein for permitting the reading of said flow meter.

In testimony whereof I have signed my name to this specification on this 12th day of February, A. D. 1921.

RUDOLPH W. SCHROEDER.